J H. ANDREWS.
Gang Plow.

No. 81,724.

Patented Sept. 1, 1868.

Witnesses:
Geo. H. Strong
Jns. L. Boone

Inventor:
J. H. Andrews
By his atty's Dewey & Co

UNITED STATES PATENT OFFICE.

JAMES H. ANDREWS, OF BENICIA, CALIFORNIA.

Letters Patent No. 81,724, dated September 1, 1868.

---

IMPROVEMENT IN GANG-PLOW.

---

*The Schedule referred to in these Letters Patent and making part of the same.*

---

TO ALL WHOM IT MAY CONCERN:

Be it known that I, JAMES H. ANDREWS, of Benicia, county of Solano, State of California, have invented an Improved Gang-Plow; and I do hereby declare the following description and accompanying drawings are sufficient to enable any person skilled in the art or science to which it most nearly appertains to make and use my said invention or improvements without further invention or experiment.

The nature of my invention is to provide an improved gang-plow, so constructed and operated that the plows can be raised and lowered without the necessity of lifting the heavy mass of wood and metal by the operator, as in case of the ordinary gang-plow.

My invention also relates to a new mode of attaching the plows to the beams or frame, and regulating the set thereof, and consists in attaching the plows to the rear end of the pole by a peculiar frame-connection, so that the points of the plow can be elevated or depressed by simply raising or lowering the end of the pole or neap, the centre of the axle being bent at right angles for that purpose. The standards of the plows are clipped to the beam or frame, and the braces are slotted, with bolts passing through them, admitting of the plows being adjusted or set to the desired depth.

Referring to the drawings forming a part of this specification—

Figure 1:
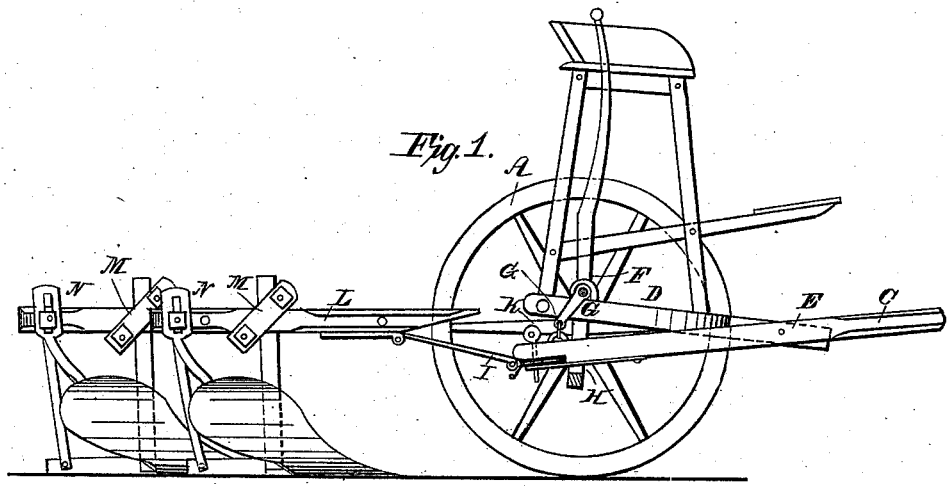
Figure 1 is a side sectional elevation.
Figure 2:
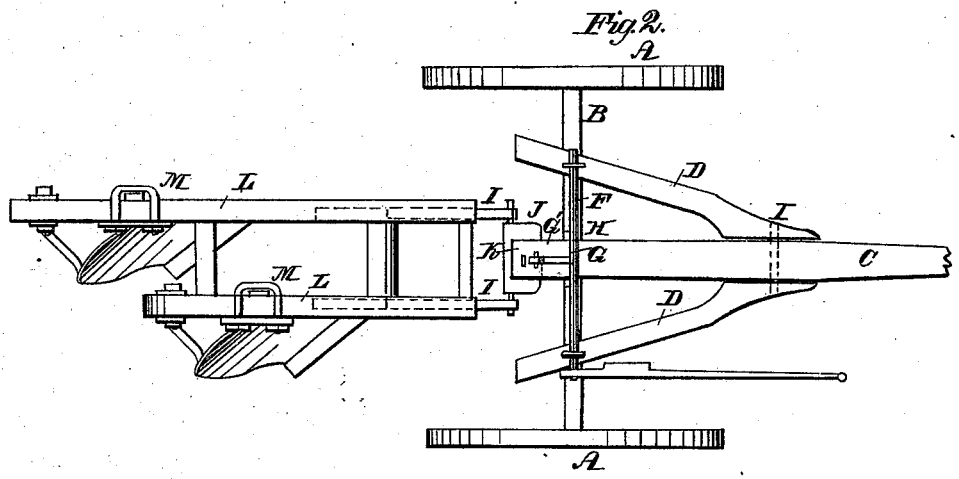
Figure 2 is a plan.

A A represent the wheels, and B the axle upon which the hounds rest, being confined by clips or bolts.

The pole C is of the ordinary construction, and is pivoted to the hounds D D by a rod, E.

A shaft, F, is placed lengthwise along the axle, across the pole and hounds, being confined by staples or boxes to the axles, and has a lever or handle at one side of the driver's seat, which is operated in the usual way in a curved rack.

The centre of the shaft is provided with an arm, G, which has a link-connection, G', with the end of the pole.

The centre of the axle is bent downward at right angles, to form an opening, H, to admit the play of the pole up and down.

To the front ends of the frame or beams of the plows is attached a light metal frame, I, it being hinged or jointed a short distance above the attachment, and again near the pole, to an apron, J. A pin, K, passes through the pole and apron, which connects the plows and frame to it.

The ends of the plow-beams or frame are chamfered, which brings it on a horizontal plane with the neap or pole, when in position, and when the plows are engaged, the beams are pressed down on the jointed frame, and prevented from entering the soil deeper until the neap or pole is lowered, which causes the points to be depressed, and as the machine is drawn along, the plows enter the ground gradually.

For throwing the plows entirely out of the ground, the pole is raised, which elevates the points, and the plows are gradually drawn to the surface. It is intended by this arrangement that the draught shall be lessened and made easier, and the backing of the plow be made possible without the driver leaving his seat.

The standards of the plows are held to the frame L L by clips M M, placed in a diagonal manner, and adjusted by nuts and screws. The land-side and mould-board braces are provided with slots, N N, through which, and the end of the frame, bolts pass, held by nuts, by means of which the heel of the plows may be raised or lowered, if necessary.

By this construction of gang-plows, the rigidity consequent to attaching the pole directly to the axle or frame, as in the ordinary gang-plows, is overcome.

Having thus described my invention, what I claim, and desire to secure by Letters Patent, is—

1. Pivoting the pole C to the hounds D D by a rod, E, and linking the rear end of the pole to the arm G, of the shaft F, or equivalent device for raising and lowering the plows without lifting other parts of the frame, substantially as described.

2. The double-jointed frame I, having an apron, J, attached and arranged to operate in the manner substantially as and for the purpose set forth.

3. The manner of connecting the plows to the frame by the clips M M, slots N N, with bolts and nuts, substantially as described.

In witness whereof, I have hereunto set my hand and seal.

JAMES H. ANDREWS. [L. S.]

Witnesses:
JNO. L. BOONE,
GEO. H. STRONG.